Patented Dec. 12, 1939

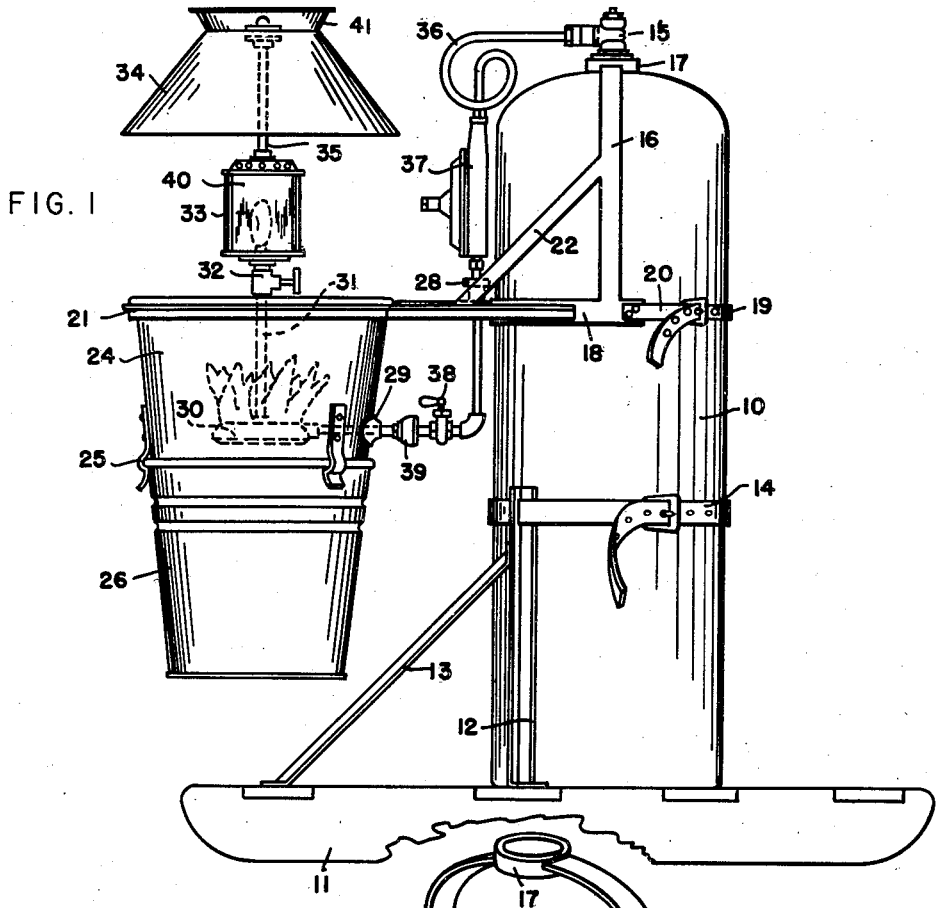
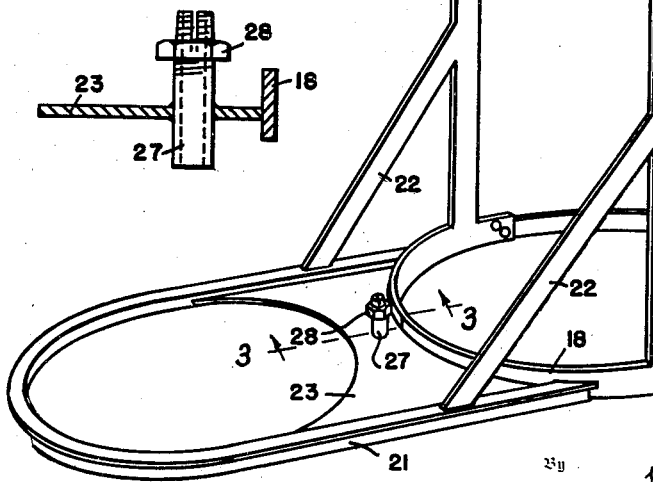

2,182,863

UNITED STATES PATENT OFFICE 2,182,863

INSECT EXTERMINATOR

Mae E. Dodder, Colton, Calif.

Application March 6, 1939, Serial No. 260,063

3 Claims. (Cl. 43—113)

My present invention relates to improvements in insect exterminators whereby advantage is taken of the known habits and characteristics of various forms of insects to lure them to a common point where they will react under impulse and instinct to cause their own destruction in the apparatus of the present invention.

Entomologists and horticulturists for some time have been making a careful study of the habits of insects that are destructive to plant life. Every form of plant has either its own peculiar destructive flying pest or has a number of different species that attack the plant and otherwise cause destruction. In some instances the flying insect is merely the parent and in itself is not destructive. The moth, for instance, does not feed during its short life but is the carrier of a multitude of eggs which are deposited upon fruit trees or fruit bearing plants, garden plants, and in fact, all forms of vegetation.

Instinct causes the insect to deposit the eggs close to a source of food supply for the worms when they are hatched from the eggs. The process then is rapid. The egg hatches in a few days under proper temperature conditions. The worm immediately, through its ability to detect the presence of fruit or the like, seeks that fruit, either causing surface injury resulting in blemish at a later period of development, or, as in most cases, enters the shell, husk, or skin of the fruit where it practically lives out the growing period of its life and in the meantime causes substantially total destruction to any fruit occupied.

During the span of time in which the worm is developing, it goes into a rest period, usually in a cocoon and eventually appears again as a flying insect or moth. This cycle may be repeated from four to seven or eight times in a single growing season. A moth may be the forebearer in a single season of hundreds of thousands of issue and it is important, therefore, that the first generation of flying insects be destroyed in order to lessen the combative force necessary later in the season for controlling these insect hordes that infest substantially every form of growth known to man.

The losses from insect pests are computed in billions of dollars and the yearly destruction in the best of organized orchards varies, according to the season, up to fifty per cent loss.

It is an object of my invention, therefore, that apparatus be provided that will attract the various forms of flying insect life and that such device shall eliminate the insects by incineration or, at least, destroy the flying ability of the insects by burning their wings and making it possible to collect them for later destruction, to the end that an important source of control may be effected.

Some insects are attracted by colors, others by a bright white light and most of these are also attracted by odors similar or akin to those given off by the fruit or blossoms of the plant life to which the particular insect is, by instinct, especially attracted.

To this end the invention consists essentially in a gas supply operating to provide an illuminated lure and a heating element combined, whereby the moths are attracted and destroyed by certain novel combinations and arrangements of parts as will be hereinafter explained.

In the accompanying drawing I have illustrated one complete example of the physical embodiment of my invention utilizing as a source of light and heat a gas under pressure in a gas container and in which the parts are combined and arranged according to the best mode I have thus far devised for the practical application of the principles of my invention, but it will be understood that changes and modifications may be made therein without departing from the scope of my invention.

For use in areas where electric power is available I may substitute an electric lamp or illuminating device and an electrical heating element in combination with the illustrated structure of the invention. These and other changes may be made within the scope of the appended claims.

Figure 1 is a view in elevation of an exterminator embodying the form of my invention.

Figure 2 is a perspective view of the frame structure for supporting the exterminator proper with respect to a gas tank or container that is available on the market.

Figure 3 is a cross section taken on the lines 3—3 of Figure 2.

In the preferred form of the invention as illustrated in my drawing I have shown a gas container 10 of standard construction which may be readily procured in almost any district or locality and which contains a supply of illuminating gas under pressure. This container on account of its size and weight I preferably mount upon a skid frame or supporting base as 11 and this frame is provided with a pair of spaced posts 12 with proper bracing rods 13 whereby the gas container may be strapped as by means of the strap 14 to the supporting base 11 to hold the tank upright, by which means it may be most readily put into use. With the tank thus mounted it may be skidded or drawn to any portion of an orchard, garden, or tract where it may be desirable for use. Gas tanks of this general design are provided with a valve structure as 15 at their upper ends. This valve structure is utilized to release the gas from the container. Over this valve I support the frame structure of the exterminator which is generally shown in Figure 2.

For rigid support to the vertical tank I construct the frame structure in the form of a yoke as 16 having a collar member 17 provided to fit over and be engaged by the valve 15 on the tank. The yoke member conforms substantially to the size and shape of the tank and the yoke 16 terminates in a substantially semi-circular band as 18 to which straps 19 and 20 may be attached and with a suitable buckle the yoke may be tied and fixed to the tank.

As a means for supporting the light and burner elements forming the chief features of the insect destroyer I fix to the yoke member constituting the supporting frame for the light and burner elements a horizontally disposed U-shaped frame as 21 which may be welded to the semi-circular ring 18 and further supported by proper brace legs as 22 to make a substantial supporting unit. Also to gain rigidity and support I fix a plate as 23 between the legs of the U and also secure this plate by welding or other suitable means to the semi-circular ring 18.

The U-shaped support 21 is adapted to receive a burner casing 24 which in turn, through means of the clips 25, supports a pail or receiver 26 that is removable for the purpose of dumping insect carcasses. The plate 23 supports an upstanding sleeve 27 formed integral therewith and this sleeve is provided with a locking nut 28 and the unit serves as a means for supporting a burner and lamp structure in a proper position for effective operation. The burner casing 24 also provides an added support where the gas feed pipe enters the casing as 29. A gas burner 30 is substantially centrally mounted within the burner casing and extending upward from the gas burner is a gas pipe 31 having a control valve 32 upon which is supported a light element 33, this element being disposed somewhat above the upper rim of the burner casing 24 so that its light rays can be seen from some distance surrounding the lamp.

Above the lamp is also arranged a semi-opaque and preferably colored shade as 34 suitably supported upon a stem 35 extending upward from the lamp element 33 and on top of the shade 34 is mounted a pan 41 to serve as a bait container.

The gas is taken from the container 10 through the pipe 36 and after passing through a gas regulator 37 is conveyed to the valve 38; thence through the mixer 39 and into the burner. A portion of the gas received in the burner is directed through the supporting pipe 31 and a valve 32 to the lamp 33 which is fitted with the mantle or Welsbach type of burner element for throwing an intense light to the surrounding territory.

The operation of the insect exterminator is generally as follows: With the yoke and supporting frame mounted upon the gas receiver 10 and with the several units above described set up in the manner set forth, the valve 38 is opened and the burner is lighted to provide a flame covering an area of approximately half the cross section of the burner casing 24. Gas is also fed to the lamp element and ignited within the mantle to provide a direct and strong light. With the unit thus operating, insects which are most common at dusk and during the early hours of the night will be attracted by the light and certain of them, due to their tendency to follow color, will be attracted by the shade. As they near the intense light they strike against the transparent glass shield 40 where their flight is stopped and they automatically drop downward onto the burner. In some instances the insects will glance upward, striking a second time on the underside of the colored shade from which they will drop downward into the receiver 26. Any attempt to fly out of this container after recovering from the shock of contacting any portion of the lamp or the shade will cause their wings to be singed or at least one wing, and cause the insects to remain trapped in the receiver.

The receiver 26 is intended to have a capacity sufficient to take care of an evening's operation. In certain instances this device has been known to collect as much as a bushel of insects in a single night and if this happens to be in the early part of the season the destructive value of the simple instrument herein disclosed is very considerable and a great aid in keeping down infestation common to the various forms of life destructive to vegetation and its fruits.

Some forms of flying insects are not necessarily attracted by light but will follow a scent, especially if it be of a kind that they are seeking, such as that given off by fruit. As example of this would be cider which has the apple scent and which when greatly diluted with water and under conditions approaching evaporation throws a heavy blanket of scent around a given area.

For the purpose of capturing this type of insect and increasing the attracting powers of the device of my invention I utilize the pan 41 mounted on top of the shade 34 and place therein scented fluid or bait which, due to the heat from the lamp, is intensified and aided in covering a considerable territory.

The combination of the scent with the light source serves to bring to the lamp a greater number of insects. Those that settle in the pan on account of the odor coming therefrom especially in the daytime when the lamp is not used, are drowned or, at least, their wings are so saturated that they can not fly and are captured in this manner. Others will hover around and come close to the light source, and will be destroyed in the manner hithertofore set forth.

Having thus fully described my invention, what I claim as new and desire to secure by Letters Patent is:

1. An insect destroyer comprising in combination a flame element, a light element above the flame element, a colored translucent shade adjacent the light element, a bait receiver arranged so that the light element will attract insect life, illuminate the shade, and heat the bait receiver.

2. An insect destroyer comprising a gas tank, a yoke frame supported on the tank and secured thereto, a portion of the frame provided to support a burner casing, another portion of the frame supporting a burner within the burner casing, a lamp above the burner and above the burner casing, a colored shade mounted above the lamp and supporting a bait receptacle, means for directing a gas supply from the tank to the burner and the lamp and releasable means on the burner casing for supporting an insect receiver.

3. In an insect destroyer, the combination with a fuel supply tank, of a frame structure having a yoke fitting over and secured to the tank, a portion of the frame extending outward from the tank and supporting a burner and its casing, of a post on the burner supporting a lamp and a post on the lamp supporting a shade, a gas supply means from the tank to the burner and to the lamp and means for regulating the gas supply, a receiver suspended from the burner casing, and a bait receptacle supported on the shade above the lamp.

MAE E. DODDER.